United States Patent
Boyce

[19]

[11] Patent Number: 5,979,309
[45] Date of Patent: Nov. 9, 1999

[54] PELLET INVERTING DEVICE

[75] Inventor: Keith W. Boyce, Philadelphia, Pa.

[73] Assignee: R. W. Hartnett Company, Philadelphia, Pa.

[21] Appl. No.: 09/211,482

[22] Filed: Dec. 14, 1998

[51] Int. Cl.[6] ............................................... B41F 17/00
[52] U.S. Cl. .................................... 101/35; 101/37
[58] Field of Search ...................... 101/35, 44, 43, 101/37, 38.1, 39, 40, 40.1; 198/384, 385

[56] References Cited

U.S. PATENT DOCUMENTS

| | | | |
|---|---|---|---|
| 1,385,000 | 7/1921 | Griffing . | |
| 2,655,247 | 10/1953 | Carroll et al. | 198/33 |
| 2,859,689 | 11/1958 | Ackley | 101/35 |
| 2,863,588 | 12/1958 | Stover | 221/212 |
| 3,084,781 | 4/1963 | Merrill | 198/33 |
| 3,447,661 | 6/1969 | Lakso et al. | 198/33 |
| 4,126,219 | 11/1978 | Bross | 198/382 |
| 4,393,973 | 7/1983 | Ackley, Sr. et al. | 198/384 |
| 4,437,559 | 3/1984 | Ackley, Sr. et al. | 198/397 |
| 4,632,028 | 12/1986 | Ackley | 101/40 |
| 4,641,672 | 2/1987 | Lewbart | 134/62 |
| 4,672,892 | 6/1987 | Ackley | 101/35 |
| 4,901,865 | 2/1990 | Staples | 209/703 |
| 5,147,047 | 9/1992 | Ahmed et al. | 209/538 |
| 5,655,453 | 8/1997 | Ackley | 101/483 |
| 5,878,658 | 3/1999 | Ackley | 101/35 |
| 5,894,801 | 4/1999 | Ackley | 101/40 X |

Primary Examiner—Edgar Burr
Assistant Examiner—Minh H. Chau
Attorney, Agent, or Firm—Synnestvedt & Lechner LLP

[57] ABSTRACT

A device useable with a pellet-marking machine for inverting a multiplicity of pellets is disclosed. Pellets are transported in cavities on carrier bars mounted on a conveyor. The carrier bars move with relation to one or more rails disposed beneath the cavities and oriented transversely to the carrier bars. Each rail has a pellet supporting surface region arranged in tandem with a trough, followed by an inclined surface, followed in turn by a second pellet supporting surface region. Initially, each pellet is partially supported on a cavity bottom and partially on an associated pellet supporting surface region. As the carrier bars pass along the rails over the troughs, each pellet tips downwardly into a respective trough, flipping past the vertical. Each pellet next encounters the inclined surface following the trough, where each pellet is fully inverted while being moved upwardly out of the trough, to be supported on the second pellet supporting surface region following each inclined surface.

29 Claims, 7 Drawing Sheets

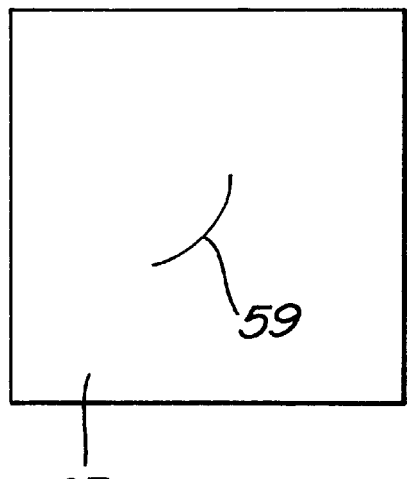
FIG. 2A
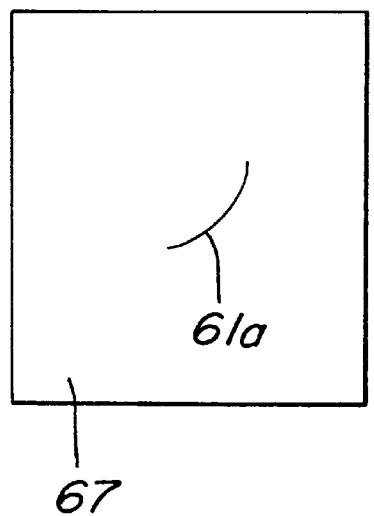
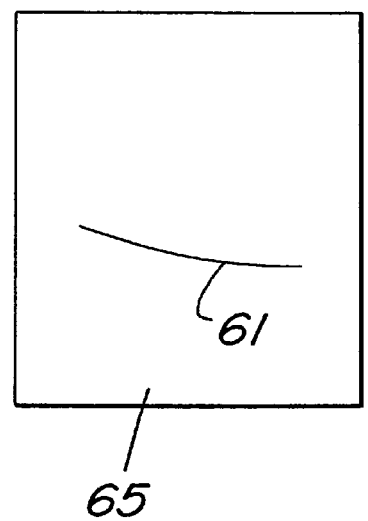
FIG. 2B

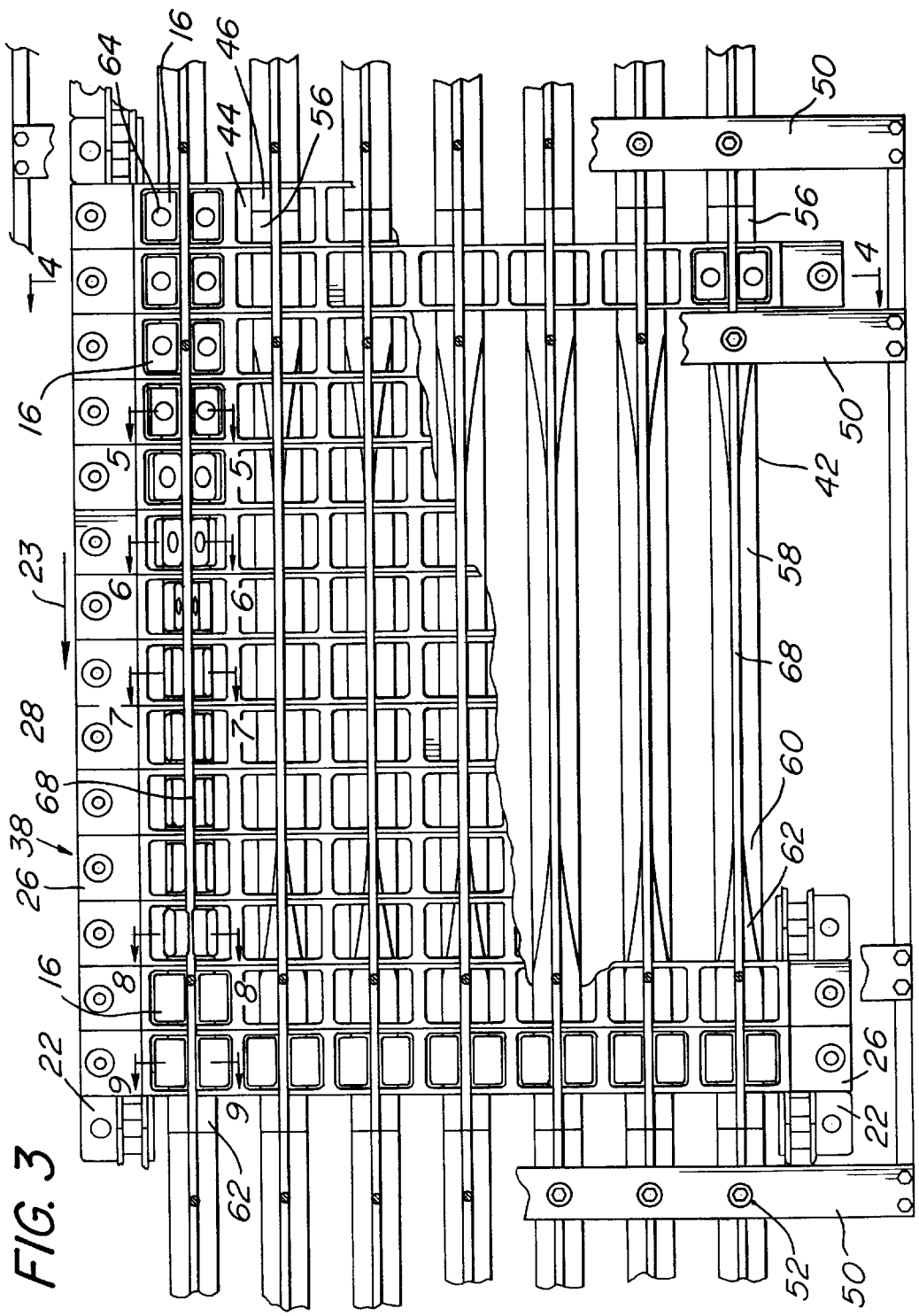

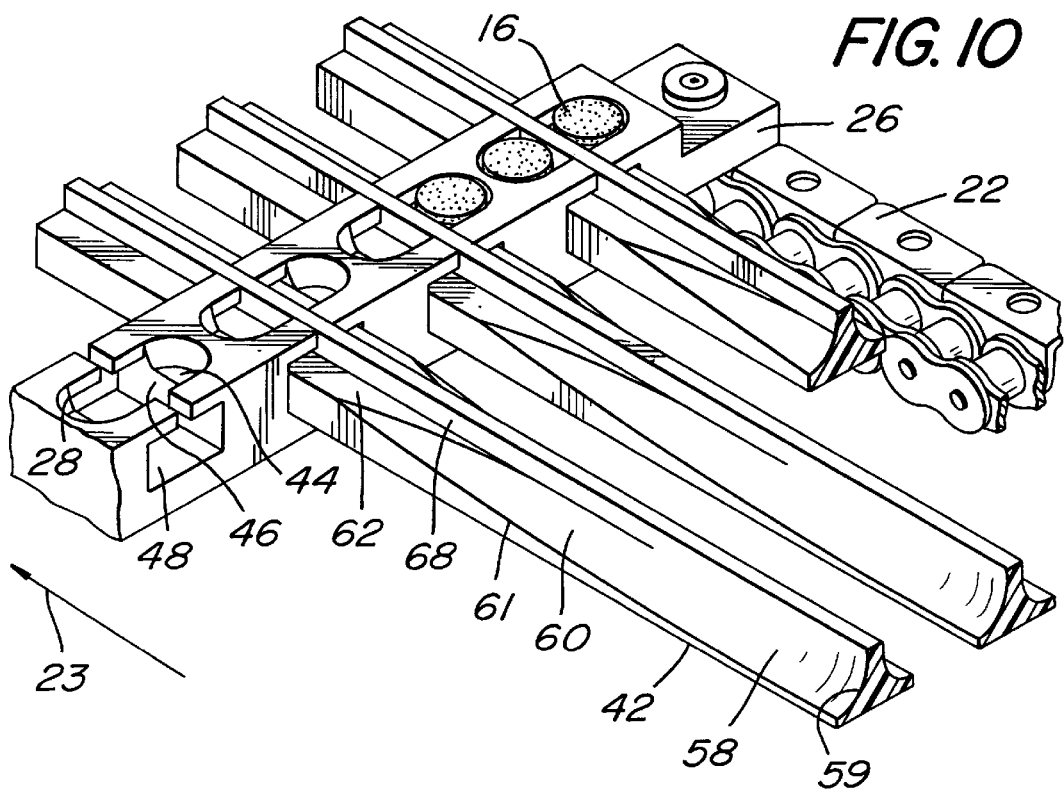

PELLET INVERTING DEVICE

FIELD OF THE INVENTION

This invention relates to a device and a method for inverting or rotating pellet-like items for inspecting the items or printing indicia on more than one surface or side of the items.

BACKGROUND OF THE INVENTION

In the manufacture of many pharmaceutical products, such as pills or lozenges, candies such as "M&Ms" or even small mechanical or electronic components, it is often desirable to imprint a trademark, indicia or other information or intelligence on more than one side of each item. These items share a common characteristic in that they are all pellet-like, being small, often round or rounded, oval, bulbous, cylindrical or polygonal in shape. Examples of pellet-like items include pills, lozenges, capsules, tablets and caplets. For convenience the term "pellet" is used hereafter to refer to pellet-like items, it being understood that the term is intended to encompass all manner of small pellet-like items similar to the examples provided above.

Machines for imprinting or "branding" pellets with indicia have long been in use, as exemplified by U.S. Pat. No. 2,859,689 to Ackley. The '689 patent discloses a pellet marking machine (FIGS. 1 and 2) which feeds pellets "P" from a hopper 22 to a rotating drum 23 which has rows of cavities 33, each of which accepts a pellet. Pellets are oriented and retained in the cavities 33 as the drum 23 rotates counterclockwise. Rotation of the drum is synchronized with an endless conveyor 24 which is positioned beneath drum 23. The conveyor has a plurality of carrier bars 110, each of which is transversely mounted on the conveyor and has a row of cavities 140 corresponding to cavities 33 on drum 23. As drum 23 rotates, cavities 33 align with cavities 140 of carrier bars 110 and the pellets are transferred to the conveyor.

The conveyor moves the pellets along a track which passes beneath a means for printing indicia on each pellet, such as the gravure printer comprising ink reservoir 25, transfer roller 26 and printing roller 27 seen in FIG. 2 of the '689 patent. The indicia are engraved on the surface of transfer roller 26 which rotates within ink reservoir 25, the ink being retained in the engravings. Printing roller 27, rotating in contact with the transfer roller, picks up the ink from the engraving and then contacts pellets "P" in carrier bars 110, printing the indicia on each pellet.

Other printing means are also known, such as ink-jet printers or laser printers, which could easily be used in place of the gravure printer shown.

Drum-and-conveyor type marking machines, as described in the '689 patent, are in widespread use in the pharmaceutical and confectionery industries and provide for reliable, high volume, high quality marking of pellets. A problem arises with such marking machines, however, when it is desired to print indicia on more than one side of a pellet. This problem is especially acute for pellets which depart from a round or cylindrical shape and are, therefore, not easily rotatable within the cavity of a carrier bar to expose another side for imprinting. Clearly, there is a need for a device which can be used in conjunction with such marking machines to rotate or invert pellets on the carrier bars to expose another or the opposite side of each pellet. This will allow further imprinting of indicia on each pellet by a second printing means without removing the pellets from the carrier bars.

SUMMARY AND OBJECTS OF THE INVENTION

The invention provides an apparatus and a method for rotating one or more pellets held on a carrier bar in order to expose plural surfaces of the pellet to printing means for imprinting indicia. The invention is further useful to sequentially expose plural surfaces of a pellet for visual or optical inspection while on a carrier bar.

SUMMARY OF THE APPARATUS

The invention comprises a carrier bar having at least one cavity sized to accept a pellet. The cavity has a bottom comprising a pellet support portion and an aperture. The aperture is arranged adjacent to the pellet support portion. An elongated rail is arranged substantially transversely to the carrier bar beneath the aperture. The carrier bar is movable with relation to the rail. The rail has a first pellet support means for supporting the pellet disposed within the cavity. A trough is arranged in tandem with the first pellet support means and extends lengthwise along the rail. The trough has an inclined surface disposed opposite the first pellet support means. A second pellet support means for supporting the pellet disposed within the cavity is arranged in tandem with the trough and adjacent to the inclined surface.

In operation of the invention, the carrier bar is moved relatively to and along the rail from the first pellet support means to the trough and to the second pellet support means. The pellet, positioned in the cavity, is supported by the pellet support portion and the first pellet support means when the first pellet support means is beneath the aperture. The pellet tips downwardly partially through the aperture and into the trough when the trough is beneath the aperture. As the carrier bar continues in its motion, the pellet traverses the inclined surface of the trough and is thereby inverted. The inverted pellet is then supported by the pellet support portion and the second pellet support means when the second pellet support means is beneath the aperture.

SUMMARY OF THE METHOD

The invention provides a method of inverting a pellet. The method entails providing the device comprising the carrier bar and rail, as described above, and positioning the carrier bar over the first pellet support means of the rail. The pellet to be inverted is positioned in the cavity of the carrier bar. The carrier bar is moved relatively to and along the rail. As the carrier bar moves over the first pellet support means, the pellet is supported by the pellet support portion of the cavity bottom and the first pellet support means of the rail. As the carrier bar moves over the trough, the pellet is allowed to tip downwardly partially through the aperture and into the trough. The pellet next traverses the inclined surface of the trough where the pellet is inverted. The carrier bar then moves over the second pellet support means where the pellet, now inverted, is supported by the pellet support portion and the second pellet support means.

PRINTING INDICIA ON BOTH SIDES OF THE PELLET

The method and apparatus described above are preferably used to print indicia or other intelligence on two sides of a pellet. Indicia are printed by providing a first means for printing indicia positioned above the first pellet support means of the rail and providing a second means for printing indicia positioned above the second pellet support means of the rail of the above describe apparatus.

The pellet is positioned in the cavity of the carrier bar with its first side facing upwardly and the carrier bar is moved relatively to and along the rail as described above. The desired indicia are printed on the first side of the pellet by the first printing means as the pellet moves beneath it. The pellet is inverted as it traverses the trough and its inclined surface, thereby having its second side face upwardly. The desired indicia are then printed on the second side of the pellet as the pellet moves beneath the second printing means.

INVERTING AND PRINTING A MULTIPLICITY OF PELLETS

By incorporating the invention into a pellet marking machine, such as, for example, the machine disclosed in the '689 patent previously described in the Background section, a practical apparatus and method for inverting or printing indicia on a plurality of surfaces of a multiplicity of pellets is produced.

Such a machine comprises an endless conveyor having a multiplicity of carrier bars arranged side-by-side on the conveyor and movable via the conveyor over a predetermined track. Each of the carrier bars has at least one, but preferably multiple cavities therein, each being sized to accept one pellet of the multiplicity of pellets. The cavities are as described above, having a bottom comprising a pellet support portion and an aperture arranged adjacent to said pellet support portion.

Several elongated rails, each also as described above, are arranged substantially transversely to the carrier bars and lengthwise along the track in a parallel, spaced apart relation. The rails are disposed beneath the apertures of the carrier bars along the track. The carrier bars are movable on the conveyor relatively to the rails. Each rail has at least a first surface region (providing the first pellet support means), a trough arranged in tandem with the first surface region, an inclined surface disposed in the trough opposite the first surface region and a second surface region (providing the second pellet support means) arranged in tandem with the trough and adjacent to the inclined surface. A first means for printing indicia on pellets is arranged above the carrier bars over the first surface region of the rails, and a second means for printing indicia on pellets is arranged above the carrier bars over the second surface region of the rails.

In operation, the carrier bars move along the track relative to and along the rails from the first surface region to the trough and further to the second surface region. The pellets positioned in the cavities are supported by the pellet support portions and the first surface regions when the first surface regions are beneath the apertures. As each pellet passes beneath the printing means, the desired indicia are printed on the upwardly facing pellet surface. Each of the pellets tips downwardly and extends partially through its respective aperture and into the trough when the trough is beneath the respective aperture. The pellets traverse the inclined surfaces of the troughs and are thereby inverted. The inverted pellets are supported by the pellet support portions and the second surface regions when the second surface regions are beneath the respective apertures. The desired indicia is printed on the upwardly facing pellet surface as each pellet passes beneath the second printing unit.

It is an object of the invention to provide a means for inverting a multiplicity of pellets for printing a plurality of indicia on each of the pellets.

It is another object of the invention to provide means for inverting a plurality of pellets which is reliable in operation.

It is yet another object of the invention to provide means for inverting a plurality of pellets which has a high product throughput.

It is still another object of the invention to provide means for inverting a plurality of pellets which will not damage the pellets.

It is also another object of the invention to provide means for rotating a multiplicity of pellets and thereby exposing plural sides of each pellet for inspection or imprinting.

It is yet another object of the invention to provide means allowing for the imprinting of indicia on plural sides of a pellet without removing the pellet from the carrier bar.

These and other objects will become apparent from a consideration of the following drawings and detailed description of the invention.

BRIEF DESCRIPTION OF THE DRAWINGS

FIG. 2A shows a curved profile projected onto a virtual plane 63, the profile being viewed along an axis normal to the plane, the view being on an enlarged scale as compared with the perspective view of the virtual plane 63 as seen in FIG. 2;

FIG. 2B shows two curved profiles, each projected onto a respective virtual plane 65 or 67, each profile being viewed along a respective axis normal to its respective plane, the views being on an enlarged scale as compared with the perspective view of the virtual planes 65, 67 as seen in FIG. 2;

FIG. 3 shows a partial cut-away top view of the pellet-inverting device according to the invention, on a scale intermediate that of FIG. 1 and that of FIG. 2, taken along line 3—3 of FIG. 1;

FIG. 10 shows a fragmentary perspective view similar to FIG. 2 of the pellet-inverting device according to the invention, the device being adapted to accept a different shaped pellet.

DETAILED DESCRIPTION OF THE PREFERRED EMBODIMENT

Description of the Pellet Marking Machine

Figure 1:
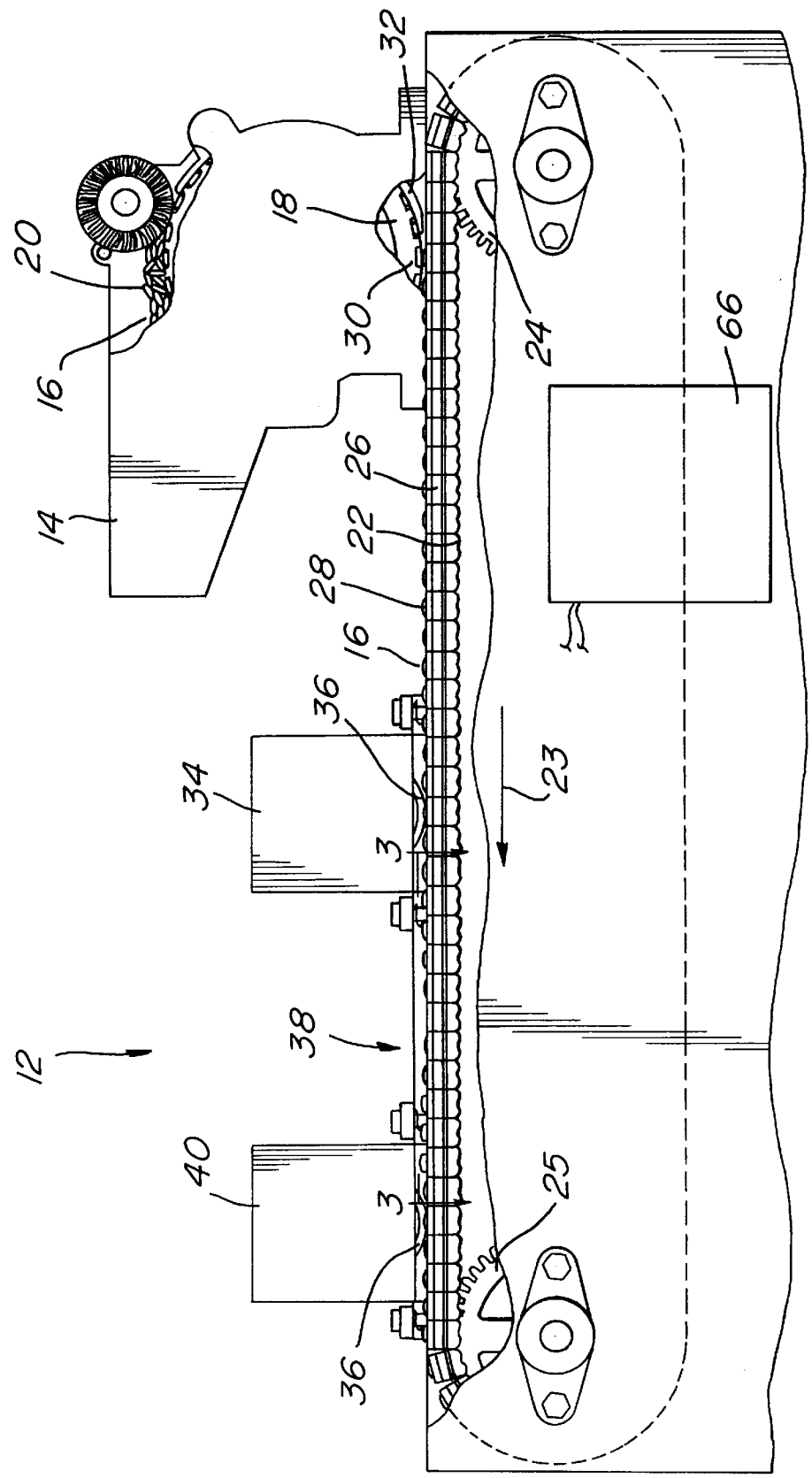
FIG. 1 shows a partially cut-away side view of a pellet-marking machine incorporating a pellet-inverting device according to the invention.

FIG. 1 shows a typical pellet-marking machine 12 in which a pellet-inverting device according to the invention is incorporated, although the inverting device is in no way limited to use only with the specific machine embodiment depicted. Machine 12 comprises a feed hopper 14 into which pellets 16 are loaded for processing. Hopper 14 is positioned adjacent to transfer drum 18 which rotates in a clockwise direction, picking up pellets from the hopper in rows of drum cavities 20 positioned circumferentially around the drum.

Transfer drum 18 is positioned above an endless conveyor 22 which runs in the direction shown by arrow 23 along a predetermined track between two sets of gear pairs 24 and 25, one set of which is powered, for example, by an electric motor (not shown). Conveyor 22 mounts a plurality of carrier bars 26, one of which is depicted in detail in FIG. 2. Carrier bars 26 have a plurality of carrier bar cavities 28 which are shaped and sized to accept pellets 16 from transfer drum 18. The rotation of the transfer drum is synchronized with the motion of conveyor 22, so that each row of drum cavities 20 aligns with a row of carrier bar cavities 28 as each row of drum cavities reaches the six o'clock position labeled 30 in FIG. 1. As drum 18 rotates, pellets 16 are retained in the drum cavities 20 by a cylindrical surface 32 positioned adjacent to the drum outer surface. The pellets fall from the drum cavities into the carrier bar cavities 28 at the six o'clock position after passing beyond the edge of the surface 32.

Pellets 16 are transported in the carrier bars by conveyor 22 in the direction noted by arrow 23 and pass beneath a first printing means 34 (FIG. 1) where the upward facing side of each pellet is imprinted with the desired indicia. Printing means 34 could be a gravure-type printer using a transfer roller 36, as shown, or could be a laser printer, an ink-jet printer or any other type of printer suitable for transferring indicia or other intelligence to the pellets. The pellets continue onward to the pellet-inverting device 38 (described in detail below) where each pellet is inverted. The inverted pellets then pass beneath a second printing means 40 where the opposite side is imprinted with the desired indicia or other intelligence. Although the same type of printing unit is shown in FIG. 1 for both first and second printing means, it is understood that any combination of different printing means is possible. It is further understood that the indicia printed on the plural sides of the pellets could be the same or different from each other.

Description of the Pellet Inverting Device

Figure 2:
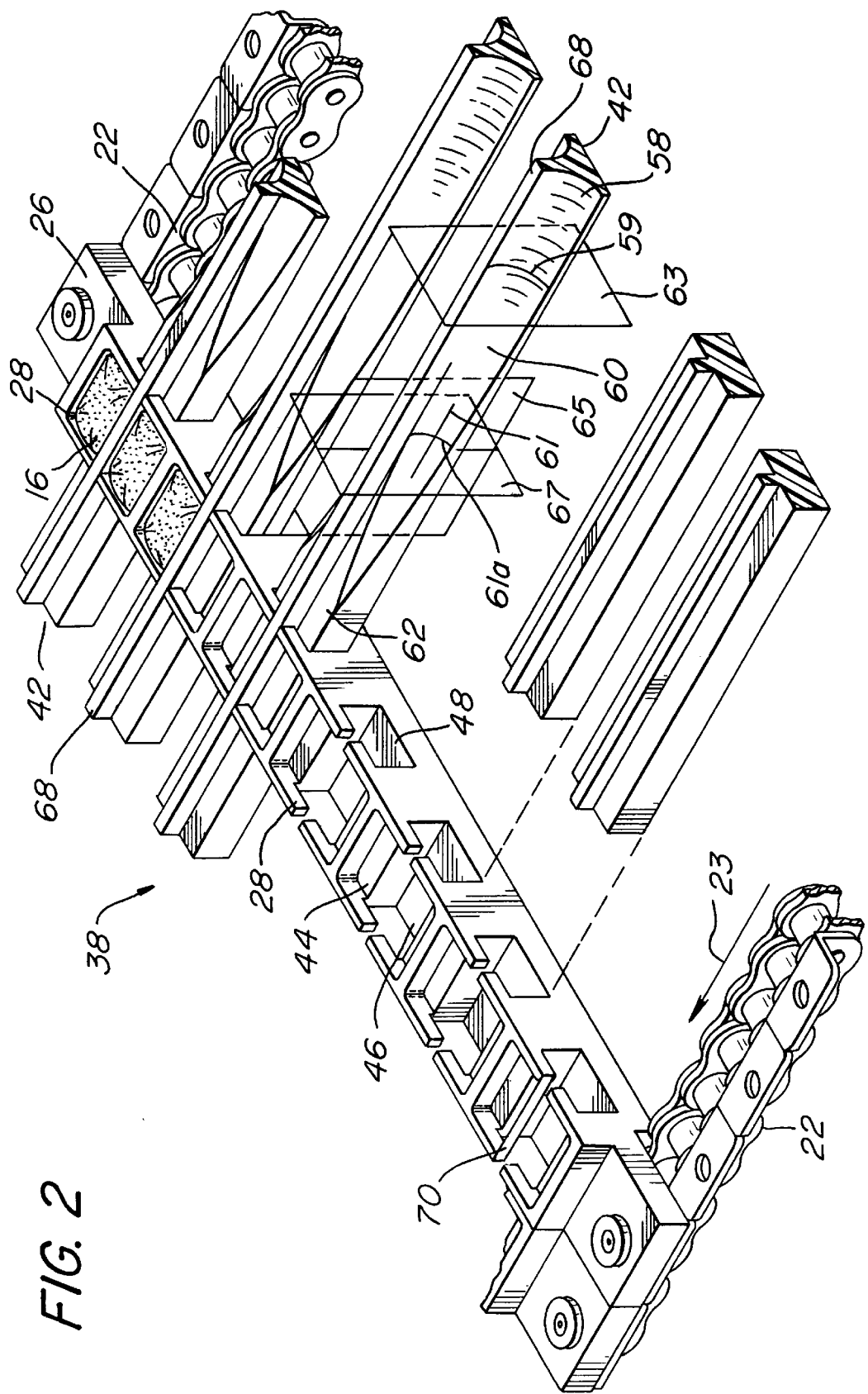
FIG. 2 shows a fragmentary perspective view, on an enlarged scale as compared with FIG. 1, of a portion of the pellet-inverting device according to the invention.

FIGS. 2 and 3 depict the pellet-inverting device 38 in detail. The device comprises at least one carrier bar 26 having at least one cavity 28 and at least one rail 42, although it is preferred to have a multiplicity of carrier bars having a multiplicity of cavities and a multiplicity of rails to process a large number of pellets. The following description is confined to a single carrier bar having a single cavity and engaging a single rail, but it is to be understood that the description is essentially the same for like components comprising the multiple components of the preferred embodiment.

Cavity 28 in carrier bar 26 has a bottom 44, which forms a pellet support portion. An aperture 46 is positioned adjacent to the pellet support portion. The carrier bar has a channel 48 which accepts rail 42 and allows the carrier bar to move with relation to and along the rail.

Figure 4:
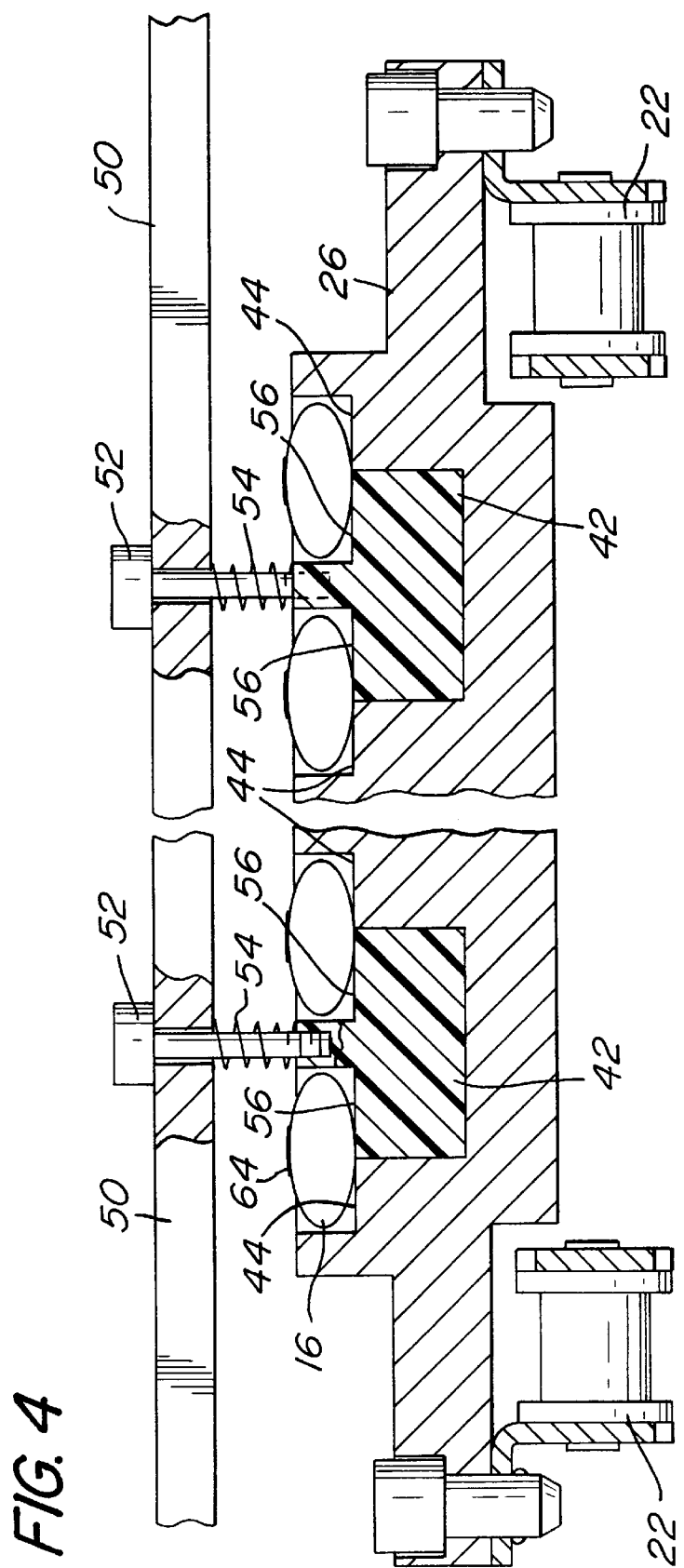
FIG. 4 shows a cross-sectional view of the pellet-inverting device according to the invention taken along line 4—4, but on an enlarged scale as compared to that of FIG. 3.

As best seen in FIGS. 3 and 4, rail 42 is arranged substantially transversely to the carrier bar and is attached to the marking machine 12 by means of support beams 50 which span the width of the marking machine above the conveyor 22. Although the rail is fixed to machine 12 relative to the carrier bar, the rail is permitted to "float" up and down by means of mounting bolts 52 which suspend the rail from support beams 50, as best seen in FIG. 4. The rail is biased downwardly by biasing springs 54 but will move up and down to accommodate upward or downward motions of the conveyor. Suspending the rail in this manner prevents it from binding in the channel 48 (FIG. 2) and jamming the conveyor 22.

Rail 42 has a first pellet support means preferably formed by a first surface region 56 arranged along the rail and seen in FIGS. 3 and 4. When the rail is interengaged with a carrier bar at the first surface region 56, the first surface region 56 and the carrier bar cavity bottom 44 are adjacent each other and support the pellet 16 disposed within the cavity 28.

A trough 58 is arranged in the rail 42 in tandem with the first surface region 56. Preferably, as seen in FIG. 2, the trough is formed by a curved depression formed in the upper surface of the rail. Trough 58 has an inclined surface 60 which is disposed opposite to the first pellet support means (surface region 56). A second pellet support means, preferably formed by a second surface region 62 of the rail is arranged in tandem with trough 58 and adjacent to inclined surface 60.

Operation of the Pellet Inverting Device

Pellets 16 are transferred from the hopper 14 to the drum 18 to the cavities 28 of carrier bars 26 upstream of first printing means 34 (FIG. 1). The pellets, supported on bottoms 44 and first surface regions 56 of rails 42 (FIG. 4), are moved on conveyor 22 beneath first printing means 34 (FIG. 1) where indicia, such as seen at 64 in FIG. 3, are imprinted onto pellets 16.

Figure 5:
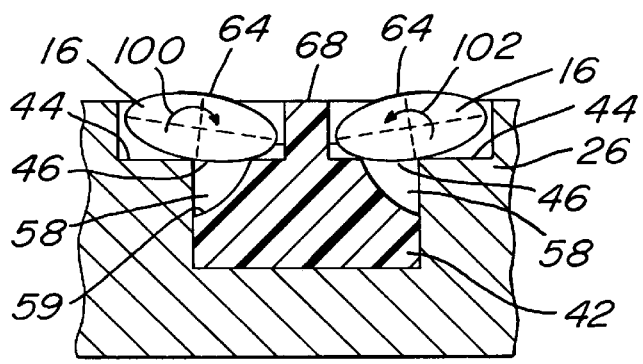
FIGS. 5 through 9 show a series of sequential cross-sectional views depicting the operation of the pellet-inverting device according to the invention, on the scale of FIG. 4, but respectively taken along lines 5—5, 6—6, 7—7, 8—8 and 9—9 of FIG. 3.

Carrier bars 26 then convey the pellets to inverting device 38 where the pellets first encounter trough 58, as seen in FIGS. 3 and 5. The pellets are no longer supported by the first surface region 56 and begin to tip downwardly through apertures 46 into troughs 58 as indicated by arrows 100 and 102 in FIG. 5. Preferably, to facilitate tipping of the pellets, the aperture comprises at least 60% of the bottom of the cavity.

Figure 6:
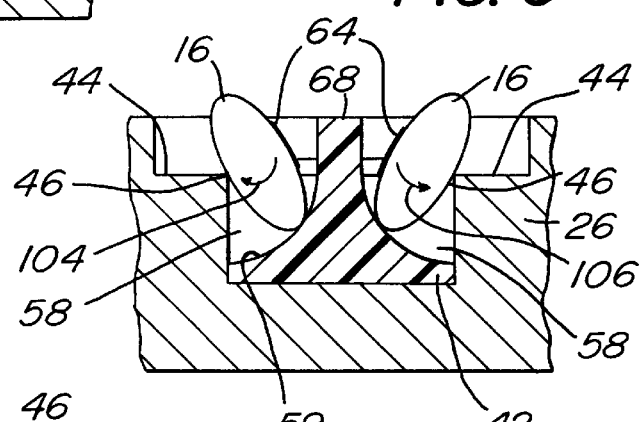
Figure 7:
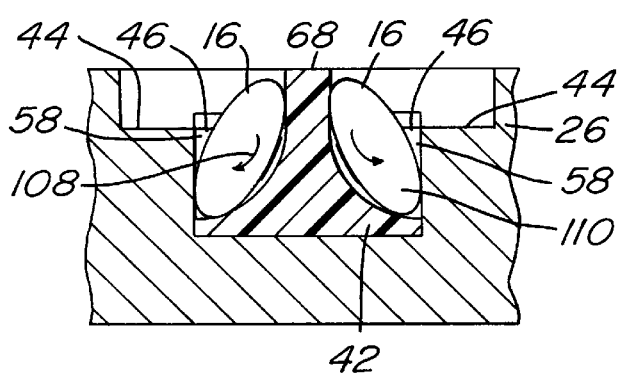

As seen in FIGS. 6 and 3, the pellets drop further into the trough 58 as the carrier bars traverse rails 42. Arrows 104 and 106 in FIG. 6 indicate the motion of the pellets. As they continue moving downwardly into the trough (FIGS. 7 and 3), the pellets tip beyond the vertical, as indicated by arrows 108 and 110 in FIG. 7, exposing a second, unprinted side upwardly. Preferably, trough 58 has a cross-sectional profile 59 having an arc of curvature, the curvature being oriented transversely to the length of the rail as best seen in the projection of the profile 59 onto a virtual plane 63 which intersects the rail at a right angle (FIGS. 2 and 2A). The curvature facilitates smooth tipping motion of the pellets 16 and may have a different radius and center of curvature depending upon the particular pellet being processed.

It may also be desirable to agitate or vibrate the pellets at this point to encourage all of them to tip completely beyond the vertical, and a vibration means 66 (seen in FIG. 1 and known in the art for other purposes) is provided to vibrate the pellets if desired. Examples of the use of vibrating or agitating devices can be found in U.S. Pat. No. 2,859,689 to Ackley and in U.S. Pat. No. 4,126,219 to Bross, both patents being hereby incorporated by reference.

Figure 8:
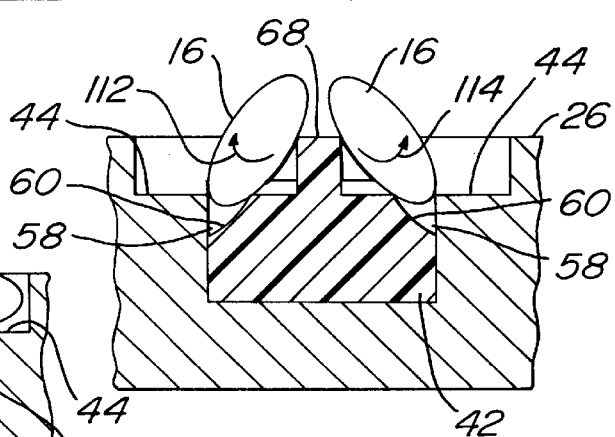

Upon further traversal of the rails 42, pellets 16 encounter inclined surface 60 and are forced upwardly out of trough 58, as seen in FIGS. 8 and 3. Preferably, the inclined surface has a longitudinal profile 61 having an arc of curvature oriented along the length of the rail as seen in the projection of profile 61 onto the virtual plane 65, which intersects the rail lengthwise (FIGS. 2 and 2B). The curvature of profile 61 facilitates the smooth transfer of the pellet upwardly out from the trough while simultaneously inverting the pellet completely.

Even more preferably, as illustrated in FIGS. 2 and 2B, inclined surface 60 has dual curvature, the inclined surface being curved both along the rail (as described immediately above for profile 61) and transversely to the rail as illustrated by profile 61a projected onto the virtual plane 67 which intersects the rail at a right angle. The second arc of curvature (profile 61a) is a cross-sectional profile having a curvature which provides a smooth transition from the curved cross sectional profile 59 of trough 58 to the inclined surface 60. The exact shape of the single-curvature profile 59 of trough 58 as well as the dual-curvature profiles 61 and 61a of the inclined surface 60 will be optimized as a function of the particular shape and size of pellet being imprinted to promote reliable inverting of the pellet.

Figure 9:
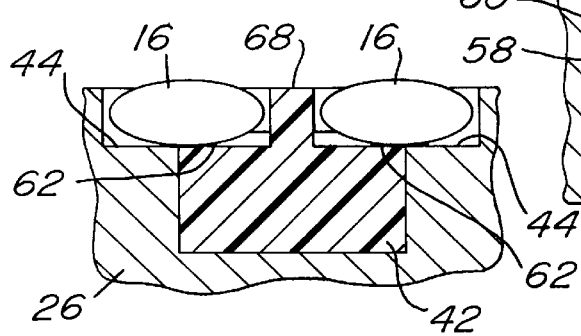

The pellets emerge through apertures 46 and preferably ride up a back wall 68 extending lengthwise along each of the rails 42 and positioned adjacent to the first and second surface regions and the trough. As seen in FIGS. 3, 8 and 9, the carrier bars 26 complete their traversal of the inclined surfaces 60, and the pellets are forced completely out of the trough whereupon they slide down back wall 68 and are supported by bottom 44 and the second surface region 62 of rails 42. The pellets slide from the back wall, rotating further as indicated by arrows 112 and 114 (FIG. 8), until they come to rest with their second side facing upwardly (FIG. 9). The pellets are then carried to the second printing means 40 (see FIG. 1) where indicia are imprinted on the second sides as the pellets pass therebeneath. The pellets are then ejected from the carrier bars as the bars rotate around gear 25 downstream of the second printing means for further processing or packaging.

While it is desirable to have back wall 68 mounted on rail 42 to shepard the pellets during inverting, similar results could also be obtained if a surface 70 were positioned on the carrier bars above apertures 46 as seen in FIG. 2. Pellets could then ride up surface 70 as the carrier bars traversed the inclined surface 60.

As noted above, first and second surface regions 56 and 62 preferably form the first and second pellet support means respectively. However, other support means are also possible, such as, for example, providing a hinged trap door (not shown) arranged at the bottom of cavity 28 adjacent to support portion bottom 44 to close off aperture 46. The trap door could be opened, for example, by a cam (not shown) to allow a pellet to tip downwardly through aperture 46 and into trough 58, the trap door being closed by a second cam (not shown), thereby bringing the pellet back upwardly through aperture 46 and into cavity 28 with a second side disposed upwardly for printing thereon.

It is preferred to make rails 42 from TEFLON® (polytetrafluoruelhylene) or DELRAN® or other such low-friction plastic material which is approved by the FDA for use in handling ingestible items. Low-friction material facilitates the smooth movement of pellets 16 over the pellet support means (first and second surface regions 56 and 62 respectively) without abrading the pellets. Low-friction material will also facilitate tipping and inverting of the pellets by providing low-friction surfaces which will not catch or bind a pellet and lock it in an undesired position which could jam the machine, damage the pellet or adversely affect the printing quality. The pellets must be uniformly positioned within the cavities of the carrier bars to ensure that the printing means encounters each pellet in the same manner to ensure uniform, high-quality printing.

FIG. 10 shows a carrier bar 26 having cavities 28 having a shape adapted to accept round pellets 16 for printing. In general, the size and shape of the cavities will be formed so as to hold a particular pellet for reliable and precise positioning for printing. The aperture 46 and the bottom 44 will have an optimum relationship for ensuring the reliable inverting of the particular pellet to be processed without damaging the pellet. While a relation of 60% aperture to 40% bottom support portion is generally preferred, the relation may change as a function of pellet shape and size as required for achieving optimum product throughput and high quality printing.

Although the description above has featured pellets basically having two sides, the pellet-inverting device according to the invention can also be used for sequentially exposing different surface areas of a pellet for printing or inspection for pellets having more than two sides. This is accomplished by including additional troughs alternating with additional surface regions spaced in tandem along rails 42. For example, to print indicia on each side of a three sided pellet, a second trough 58 is positioned in rail 42 downstream of second surface region 62. A third surface region providing means for supporting the pellet is positioned downstream of the second trough, and a third printing means is positioned over the third surface region.

The three-sided pellet (not shown) is conveyed beneath the first printing means where it is imprinted. The pellet next encounters the first trough where it is rotated by tipping into the trough so that its second side is facing upwardly. The pellet passes beneath the second printing means where the second side is imprinted. The pellet encounters the second trough which rotates the pellet, exposing its third side (not shown) upwardly. The pellet then passes beneath the third printing means (not shown) where it is imprinted.

The pellet-inverting device according to the invention permits reliable inverting or rotation of pellets for inspection or imprinting of the pellets. The device is readily adaptable to pellet marking machines currently in extensive use in both the pharmaceutical and confectionery industries and can provide for large pellet throughput without damaging pellets or jamming the marking machines.

What is claimed is:

1. A pellet-inverting device, comprising:
   a carrier bar having a cavity therein sized to accept the pellet, said cavity having a bottom comprising a pellet support portion and having an aperture therein adjacent to said pellet support portion;
   a rail arranged substantially transversely to said carrier bar beneath said aperture, said rail having:
      first pellet support means for supporting the pellet disposed within said cavity;
      a trough having an inclined surface disposed opposite said first pellet support means;
      second pellet support means for supporting the pellet disposed within said cavity, said second pellet support means being arranged in tandem with said trough and adjacent to said inclined surface; and
   said carrier bar being movable with relation to and along said rail from said first pellet support means to said trough and to said second pellet support means, the pellet disposed in said cavity being supported by said first pellet support means when said first pellet support means is beneath said aperture, the pellet tipping downwardly partially through said aperture and into said trough when said trough is beneath said aperture, the pellet traversing said inclined surface of said trough and being thereby inverted, the pellet being supported by said pellet support portion and said second pellet support means when said second pellet support means is beneath said aperture.

2. A pellet-inverting device according to claim 1, wherein said first pellet support means comprises a first surface region extending outwardly from and along said rail.

3. A pellet-inverting device according to claim 1, wherein said second pellet support means comprises a second surface region extending outwardly from and along said rail.

4. A pellet-inverting device according to claim 1, wherein said trough has a cross-sectional profile having a curvature, said curvature being oriented transversely to the length of said rail.

5. A pellet-inverting device according to claim 1, wherein said inclined surface has a longitudinal profile having a curvature oriented along the length of said rail.

6. A pellet-inverting device according to claim 1, wherein said inclined surface has a cross-sectional profile having a curvature oriented transversely to the length of said rail.

7. A pellet-inverting device according to claim 1, wherein said inclined surface has dual curvature comprising a cross-sectional profile having a first curvature oriented transversely to the length of said rail and a longitudinal profile having a second curvature oriented along the length of said rail.

8. A pellet-inverting device according to claim 1, further comprising a back wall extending lengthwise along said rail adjacent to said first and second pellet support means and said trough, said wall extending outwardly from said rail.

9. A pellet-inverting device according to claim 1, wherein said rail is made from polytetrafluoruelhylene Teflon®.

10. A pellet-inverting device according to claim 1, wherein said cavity has a shape adapted to accept the pellet.

11. A pellet-inverting device according to claim 10, wherein said cavity has a rectangular shape adapted to accept a rectangular pellet.

12. A pellet-inverting device according to claim 1, wherein said aperture comprises at least 60% of said bottom.

13. A pellet-inverting device according to claim 1, further comprising a second cavity arranged in said carrier bar, said second cavity having a bottom comprising a pellet support portion and an aperture arranged adjacent to said pellet support portion, said rail further having:
   third pellet support means for supporting the pellet disposed within said second cavity;
   a second trough arranged in tandem with said third pellet support means, said second trough having a second inclined surface disposed opposite to said third pellet support means;
   fourth pellet support means for supporting the pellet disposed within said second cavity, said fourth pellet support means being arranged in tandem with said second trough and adjacent to said second inclined surface.

14. A pellet-inverting device according to claim 13, wherein said second cavity is arranged adjacent to said cavity, said third pellet support means is arranged adjacent to and coextensive with said first pellet support means, said second trough is arranged adjacent to and coextensive with said trough, and said fourth pellet support means is arranged adjacent to and coextensive with said second pellet support means.

15. A pellet-inverting device according to claim 1, further comprising means for vibrating said device operatively associated therewith.

16. A method of inverting a pellet, comprising the steps of:
   providing a carrier bar having a cavity therein sized to accept the pellet, said cavity having a bottom comprising a pellet support portion and an aperture arranged adjacent to said pellet support portion;
   providing a rail arranged substantially transversely to said carrier bar beneath said aperture, said rail and said carrier bar being movable relative to one another;
   providing a first pellet support means on said rail for supporting the pellet disposed within said cavity;
   providing a trough on said rail arranged in tandem with said first pellet support means;
   providing an inclined surface arranged in said trough opposite said first pellet support means;
   providing a second pellet support means on said rail for supporting the pellet disposed within said cavity, said second pellet support means being arranged in tandem with said trough and adjacent to said inclined surface;
   positioning said carrier bar over said first pellet support means;
   positioning the pellet in said cavity;
   moving said carrier bar relatively to and along said rail over said first pellet support means whereby the pellet is supported by said pellet support portion and said first pellet support means;
   moving said carrier bar with relation to and along said rail over said trough;
   allowing the pellet to tip downwardly partially through said aperture and into said trough;
   allowing the pellet to traverse said inclined surface, the pellet being inverted thereby; and
   moving said carrier bar with relation to and along said rail over said second pellet support means whereby the pellet, now inverted, is supported by said pellet support portion and said second pellet support means.

17. A method of inverting a pellet according to claim 16, further comprising the step of vibrating the pellet.

18. A method of printing indicia on two sides of a pellet having first and second sides, said method comprising the steps of:
   providing a carrier bar having a cavity therein sized to accept the pellet, said cavity having a bottom comprising a pellet support portion and an aperture arranged adjacent to said pellet support portion;
   providing a rail arranged substantially transversely to said carrier bar beneath said aperture, said rail and said carrier bar being movable relative to one another;
   providing a first pellet support means on said rail for supporting the pellet disposed within said cavity;
   providing a first means for printing indicia on the pellet arranged above said first pellet support means;
   providing a trough in said rail and arranged in tandem with said first pellet support means;
   providing an inclined surface arranged in said trough opposite said first pellet support means;
   providing a second pellet support means on said rail for supporting the pellet disposed within said cavity, said second pellet support means being arranged in tandem with said trough and adjacent to said inclined surface;
   providing a second means for printing indicia on the pellet arranged above said second pellet support means;
   positioning said carrier bar over said first pellet support means upstream of said first printing means;
   positioning the pellet in said cavity with the first side facing upwardly;
   moving said carrier bar relatively to and along said rail over said first pellet support means beneath said first printing means, the pellet being supported by said pellet support portion and said first pellet support means;
   printing the indicia on the first side of the pellet as the pellet moves beneath said first printing means;

moving said carrier bar relatively to and along said rail over said trough;

allowing the pellet to tip downwardly partially through said aperture and into said trough;

allowing the pellet to traverse said inclined surface, the pellet being thereby inverted and having the second side facing upwardly;

moving said carrier bar relatively to and along said rail over said second pellet support means and beneath said second printing means, the pellet, now inverted, being supported by said pellet support portion and said second pellet support means; and printing the indicia on the second side of the pellet as the pellet moves beneath said second printing means.

19. A method of printing indicia on two sides of a pellet according to claim 18, further comprising the step of vibrating the pellet.

20. A method of printing indicia on two sides of a pellet according to claim 18, wherein the indicia printed on the first side are the same as the indicia printed on the second side.

21. An apparatus for inverting a multiplicity of pellets, said apparatus comprising:

an endless conveyor;

a multiplicity of carrier bars arranged side by side on said conveyor and movable via said conveyor over a predetermined track, each of said carrier bars having at least one cavity therein sized to accept one pellet of said multiplicity of pellets, said cavity having a bottom comprising a pellet support portion and an aperture arranged adjacent to said pellet support portion;

a rail arranged substantially transversely to said carrier bars and lengthwise along said track, said rail being disposed beneath said apertures of said carrier bars along said track, said carrier bars being movable on said conveyor relatively to said rail, said rail having:

a first surface region for supporting the pellets disposed within said cavities;

a trough arranged in tandem with said first surface region, said trough having an inclined surface disposed opposite said first surface region;

a second surface region for supporting the pellets disposed within said cavities, said second surface region being arranged in tandem with said trough and adjacent to said inclined surface; and said carrier bars being movable along said track relatively to and along said rail from said first surface region to said trough and to said second surface region, the pellets positioned in said cavities being supported by said pellet support portions and said first surface region when said first surface region is beneath said apertures, each of the pellets tipping downwardly partially through a respective aperture and into said trough when said trough is beneath said respective aperture, the pellets traversing said inclined surface of said trough and being thereby inverted, the inverted pellets being supported by said pellet support portion and said second surface region when said second surface region is beneath said respective apertures.

22. An apparatus according to claim 21, further comprising means for suspending said rail for vertical motion in compliance with vertical motions of said carrier bar.

23. An apparatus according to claim 22, wherein said suspending means comprises a support beam arranged transversely to and above said rail and a mounting bolt extending through said beam and interengaging said rail, said bolt being vertically movable relative to said beam.

24. An apparatus according to claim 23, further comprising a means for biasing said rail away from said support beam.

25. An apparatus for printing indicia on a multiplicity of pellets, each pellet having at least two sides, said apparatus comprising:

an endless conveyor;

a multiplicity of carrier bars arranged side by side on said conveyor and movable via said conveyor over a predetermined track, each of said carrier bars having at least one cavity therein sized to accept one of the pellets, said cavity having a bottom comprising a pellet support portion and an aperture arranged adjacent to said pellet support portion;

a rail arranged substantially transversely to said carrier bars and lengthwise along said track, said rail being disposed beneath said apertures of said carrier bars along said track, said carrier bars being movable on said conveyor relatively to said rail, said rail having:

a first surface region for supporting the pellets disposed within said cavities;

a trough arranged in tandem with said first surface region, said trough having an inclined surface disposed opposite said first surface region;

a second surface region for supporting the pellets disposed within said cavities, said second surface region being arranged in tandem with said trough and adjacent to said inclined surface;

a first means for printing indicia on the pellets arranged above said track over said first surface region;

a second means for printing indicia on the pellets arranged above said track over said second surface region; and said carrier bars being movable along said track relatively to and along said rail from said first surface region to said trough and to said second surface region, the pellets positioned in said cavities being supported by said pellet support portions and said first surface region when said first surface region is beneath said apertures, said first printing means printing indicia on each of the pellets as they pass beneath said first printing means, each of the pellets tipping partially downwardly through a respective aperture and into said trough when said trough is beneath said apertures, the pellets traversing said inclined surface of said trough and being thereby inverted, the inverted pellets being supported by said pellet support portions and said second surface region when said second surface region is beneath said aperture, said second printing means printing indicia on each of the pellets as they pass beneath said second printing means.

26. An apparatus for sequentially exposing different surface areas of a pellet for printing indicia thereon, said apparatus comprising:

a carrier bar having an upper surface;

a cavity arranged in said upper surface sized to accept the pellet, said cavity having a bottom surface for partially supporting the pellet, said bottom surface extending partially across said cavity thereby defining an aperture in said carrier bar positioned adjacent to said bottom surface;

a rail arranged transversely to said carrier bar beneath said aperture, said rail having:

a first surface region for supporting the pellet disposed within said cavity;

a trough arranged in tandem with said first surface region, said trough having an inclined surface disposed opposite said first surface region;

a second surface region for supporting the pellet disposed within said cavity, said second surface region being arranged in tandem with said trough and adjacent to said inclined surface; and said carrier bar being movable relatively to and along said rail from said first surface region to said trough and to said second surface region, the pellet positioned in said cavity and exposing a first surface area upwardly for printing indicia thereon, the pellet being supported by said bottom surface and said first surface region when said first surface region is beneath said aperture, the pellet tipping downwardly partially through said aperture and into said trough and thereby presenting a second surface area upwardly for printing indicia thereon when said trough is beneath said aperture, the pellet traversing said inclined surface and being supported by said bottom surface and said second surface region when said second surface region is beneath said aperture.

27. An apparatus according to claim 26, wherein said first surface area is oppositely arranged on the pellet to said second surface area.

28. An apparatus according to claim 26, wherein said bottom surface extends at most 40% across said cavity.

29. An apparatus according to claim 26, wherein said rail further comprises:

a second trough arranged in tandem with said second surface region, said second trough having a second inclined surface disposed opposite to said second surface region;

a third surface region arranged in tandem with said second trough adjacent to said inclined surface; and said carrier bar being movable relatively to and along said rail from said second surface region to said second trough and to said third surface region, the pellet positioned in said cavity for exposing said second surface area upwardly for printing indicia thereon being supported by said bottom surface and said second surface region when said second surface region is beneath said aperture, the pellet tipping downwardly partially through said aperture and into said second trough for presenting a third surface area upwardly for printing indicia thereon when said second trough is beneath said aperture, the pellet being supported by said bottom surface and said third surface region when said third surface region is beneath said aperture.

* * * * *

UNITED STATES PATENT AND TRADEMARK OFFICE
CERTIFICATE OF CORRECTION

PATENT NO. : 5,979,309
DATED : November 9, 1999
INVENTOR(S) : Boyce

It is certified that error appears in the above-identified patent and that said Letters Patent is hereby corrected as shown below:

Column 7, line 47, "(polytetrafluoruelhylene)" should be --(polytetrafluoroethylene)--

Column 9, line 25, "polytetrafluoruelhylene" should be --polytetrafluoroethylene-- and delete Teflon®

Signed and Sealed this

Twenty-third Day of May, 2000

Attest:

Q. TODD DICKINSON

*Attesting Officer*  *Director of Patents and Trademarks*